United States Patent [19]

Yoshisato et al.

[11] Patent Number: 4,719,527
[45] Date of Patent: Jan. 12, 1988

[54] COMPOSITE MAGNETIC HEAD HAVING ACCURATELY ALIGNED GAPS

[75] Inventors: Yorinobu Yoshisato, Hirakata; Hideki Yoshikawa, Osaka; Kazuhiko Taketa, Hirakata; Isao Yasuda, Katano; Kenji Kubota, Hirakata; Kazuhiko Takahashi, Amagasaki, all of Japan

[73] Assignee: Sanyo Electric Co., Ltd., Osaka, Japan

[21] Appl. No.: 793,007

[22] Filed: Oct. 30, 1985

[30] Foreign Application Priority Data

Oct. 31, 1984 [JP] Japan .............................. 59-229807
May 14, 1985 [JP] Japan .............................. 60-102071
May 16, 1985 [JP] Japan .............................. 60-104248
May 17, 1985 [JP] Japan .............................. 60-106382
May 17, 1985 [JP] Japan .............................. 60-106383

[51] Int. Cl.⁴ .......................... G11B 5/29; G11B 5/31; G11B 5/17
[52] U.S. Cl. .................... 360/121; 360/122; 360/123; 360/126; 360/128
[58] Field of Search ............... 360/121, 119, 123, 126, 360/127, 122, 128

[56] References Cited

U.S. PATENT DOCUMENTS 3,685,144  8/1972  Trimble ............................ 360/123
4,124,874 11/1978  Zneimer ........................... 360/121
4,357,640 11/1982  Heinz et al. ..................... 360/123
4,416,056 11/1983  Takahashi ........................ 360/123
4,432,028  2/1984  Desserre et al. ................. 360/113
4,622,616 11/1986  Isshiki ........................... 360/122

Primary Examiner—Robert S. Tupper
Attorney, Agent, or Firm—Armstrong, Nikaido, Marmelstein & Kubovcik

[57] ABSTRACT

A magnetic head which comprises a pair of head chips each composed of a pair of plate-like magnetic cores superposed on and joined to each other with a spacer interposed therebetween and having a gap at the junction, a pair of base plates joined to the pair of head chips individually and positioned on opposite sides of and in parallel to a plane containing the gaps, each of the magnetic core having at one end thereof a head with a small width substantially equal to the width of tracks and an end portion of increased width opposite to the head, a shield member interposed between the head chips at the head portions, a stud portion provided on at least one of the pair of magnetic cores and projecting toward the other core, and a coil provided around the stud portion. A process is also disclosed for producing such magnetic heads wherein the pair of magnetic cores are positioned close to each other, and the gaps are accurately positioned on the same plane.

9 Claims, 24 Drawing Figures

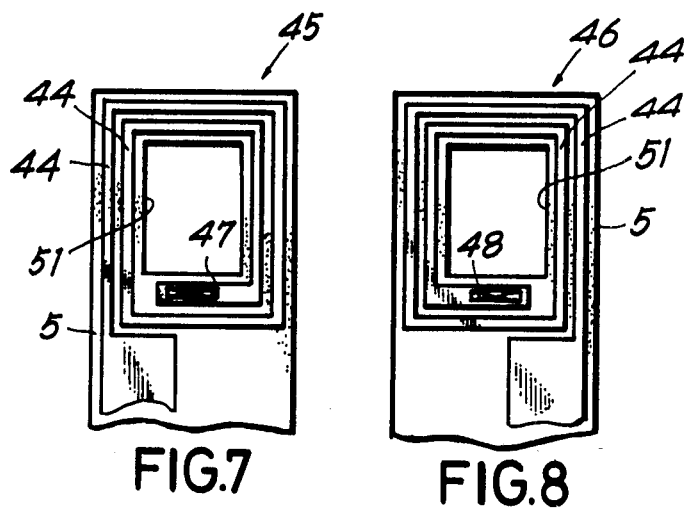
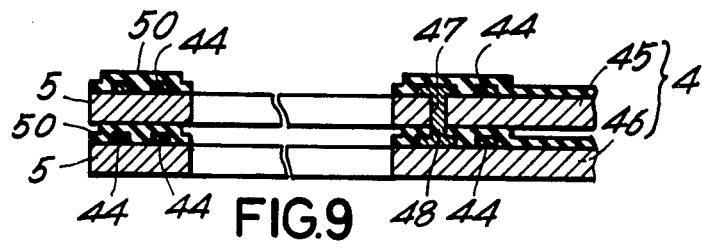
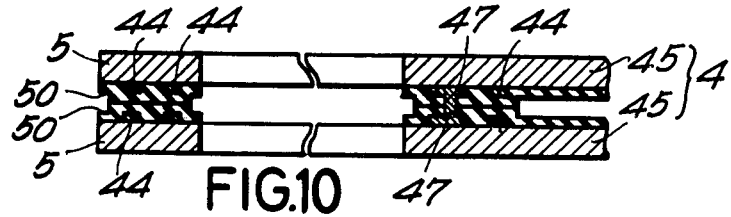
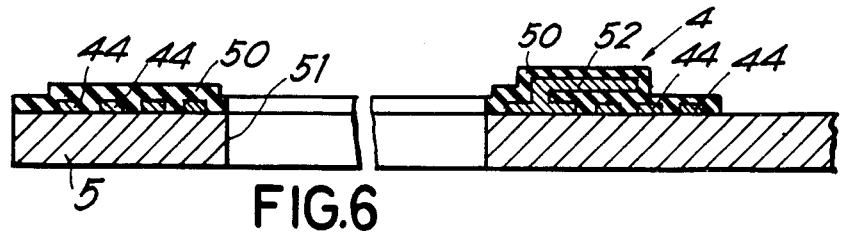

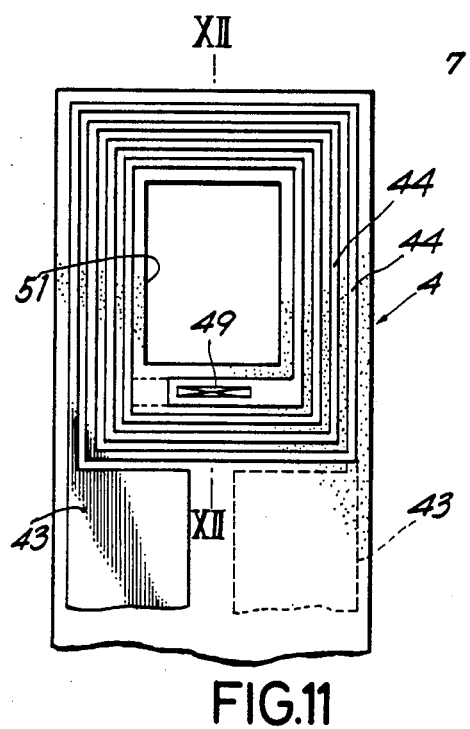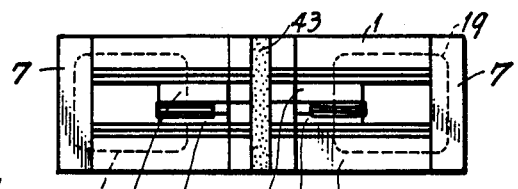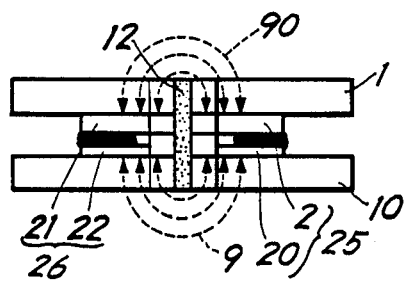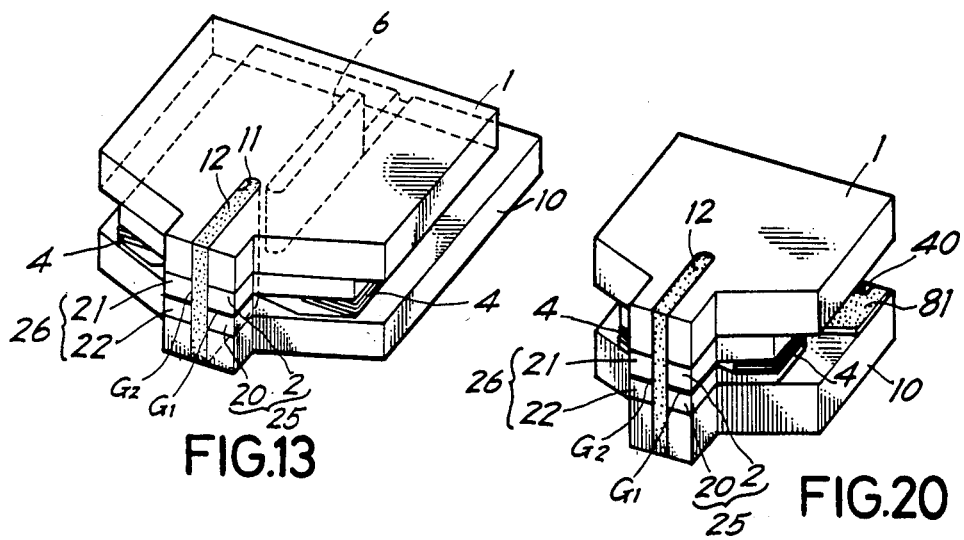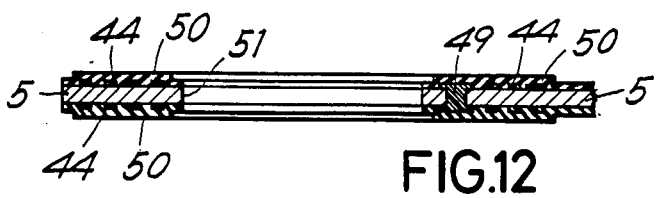

COMPOSITE MAGNETIC HEAD HAVING ACCURATELY ALIGNED GAPS

BACKGROUND OF THE INVENTION

Electronic still cameras for recording static images on a magnetic record medium in the form of a disc include a pair of magnetic heads which are adapted for sliding contact with the signal bearing surface of the record medium in rotation and by which signals are delivered to or received from two tracks of the medium at the same time or alternately.

The present applicant has already proposed such a magnetic head of the composite type as shown in FIGS. 23 and 24. The proposed magnetic head is disclosed in detail in published unexamined Japanese patent application SHO No. 60-147912.

The magnetic head comprises a pair of head chips 25, 26 fixed to each other with a shield member 12 interposed therebetween, and base plates 1, 10 are secured to the outer sides of the head chips 25,26, respectively, to give increased strength to the assembly. Each head chip 25 (26) comprises a pair of plate-like magnetic cores 2, 20 (21, 22) prepared from a magnetic bulk material, having a thickness equal to the width of the track and butting against each other. At the front ends of the butting joints, gaps G1 and G2 are formed. The head chips 25, 26 and the base plates 1, 10 are each formed with a coil window 41 for providing coils 4. A magnetic record medium moves in a direction perpendicular to a plane containing the gaps G1 and G2.

According to the present standard, the width of the track, i.e. the thickness X of the magnetic cores 2, 20, 21, 22 is about 60 $\mu$m, and the spacing H between the pair of head chips 25 and 26 is 40 $\mu$m.

The shield member 12 interposed between the two head chips 25 and 26 prevents cross talk of signals owing to the interference of the electro-magnetic fields when signals are recorded or reproduced because the two gaps are very close to each other.

To assure that the magnetic head will be usable for different types of cameras, the two head chips 25 and 26 must be so arranged that the gaps G1 and G2 are positioned on the same plane.

However, because of the necessity of forming the coils, the magnetic head needs to be produced by fabricating the two head chips 25, 26 individually, winding a wire around each of the chips 25, 26 and thereafter assembling the head chips 25, 26 as arranged side by side at a spacing equal to the specified pitch of the tracks. The production of the magnetic head therefore requires an adjusting procedure for arranging the two gaps on the same plane, and the adjusting procedure renders the magnetic head inefficient to produce in quantities. Further even if the adjustment is made, the two gaps inevitably involve some adjustment error, so that variations in the adjustment error reduce the yield or record reproductivity of the magnetic head.

SUMMARY OF THE INVENTION

An object of the present invention is to provide the structure of a magnetic head wherein a pair of gaps can be arranged accurately on a plane and a process for producing the magnetic head.

Another object of the present invention is to provide a magnetic head which comprises a pair of magnetic cores constituting each head chip and fixedly superposed on each other in a plane substantially parallel to a plane containing two gaps, each of the magnetic cores having a head equal in width to the width of tracks, the gap being formed between the heads of the pair of magnetic cores joined to each other, a stud being provided at the junction between the pair of magnetic cores approximately perpendicular to the plane of junction, a coil being provided around the stud.

Another object of the present invention is to achieve improved productivity by fitting a sheet-like coil to the stud of the magnetic core described above, the sheet-like coil comprising a base film made of an insulating material, a strip-like conductor extending spirally on the base film and an insulating film covering the conductor.

Another object of the present invention is to provide a process for producing the magnetic head described above which is characterized in that a single magnetic plate is made into a pair of magnetic cores arranged on a plane with a shield portion provided therebetween.

Another object of the present invention is to provide a magnetic head of the type described wherein two head chips are magnetically shielded from each other with improved effectiveness by fixedly providing base plates on opposite sides of, and in parallel with, a plane containing the gaps of the head chips, the base plates being made of a magnetic or nonmagnetic metal material.

Still another object of the present invention is to provide a magnetic head of the type described wherein the head chips are fixedly provided with magnetic blocks opposed to each other in the direction of arrangement of the gaps to assure still improved magnetism shielding properties.

BRIEF DESCRIPTION OF THE DRAWINGS

FIG. 6 is a view in section taken along the line VI—VI in FIG. 5;

FIGS. 7 and 8 are plan views showing a pair of coil half segments constituting a sheet-like coil of two-layer structure;

FIG. 9 is a sectional view showing the sheet-like coil of two-layer structure;

FIG. 10 is a sectional view showing another embodiment of sheet-like coil of two-layer structure;

FIG. 11 is a plan view showing another embodiment of sheet-like coil of two-layer structure;

FIG. 12 is a view in section taken along the line XII—XII in FIG. 11;

FIG. 13 is a perspective view showing a magnetic head having a rear shield plate;

FIGS. 18 and 19 are plan views illustrating . lines of magnetic force through the magnetic head of FIG. 15;

FIG. 20 is a perspective view showing a magnetic head including base plates of nonmagnetic metal material;

DETAILED DESCRIPTION OF THE INVENTION

Figure 1:
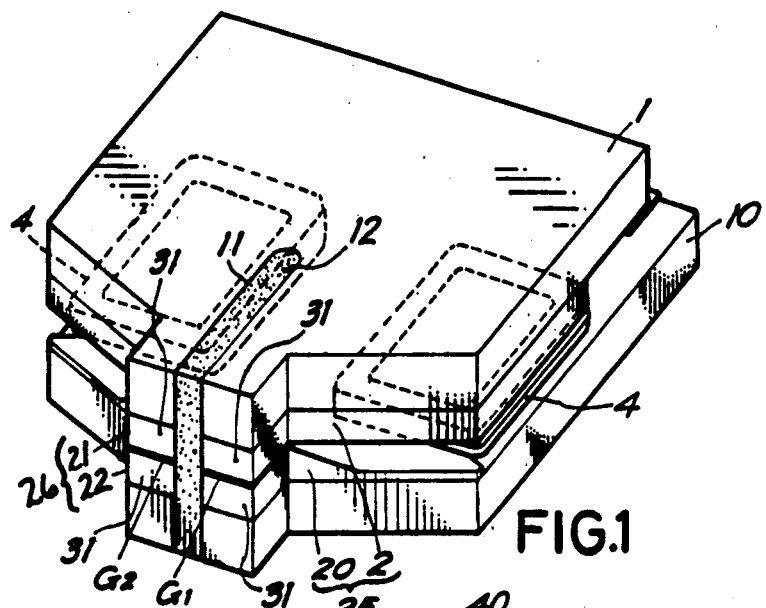
FIG. 1 is a perspective view showing a magnetic head.
Figure 2:
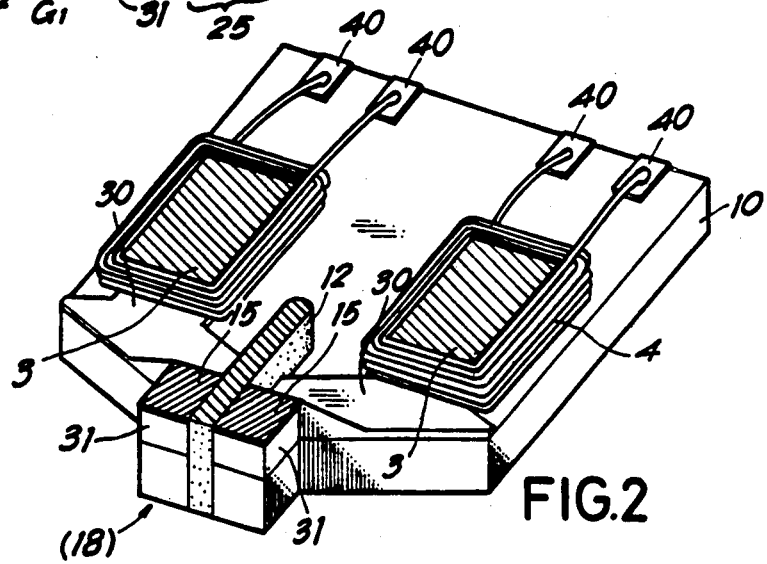
FIG. 2 is a sectional view of FIG. 1.

FIG. 1 shows the appearance of the magnetic head of the present invention, and FIG. 2 is a view in section taken along the plane through two gaps G1 and G2 of the magnetic head to show the interior.

The magnetic head comprises pairs of plate-like magnetic cores 2, 20 and 21, 22 made of a highly magnetically permeable material, such as sendust or Co-Fe amorphous ribbon, and constituting a pair of symmetric head chips 25 and 26. The magnetic cores of each pair are fixedly superposed on each other face-to-face. The head chips 25 and 26 are fixedly sandwiched between nonmagnetic base plates 1 and 10 to give increased strength to the assembly. The base plates 1 and 10 are made of a material close to sendust in coefficient of thermal expansion, such as α-quartz, α-cristobalite or like crystallized glass having a crystal phase, or $MnO_2$-NiO nonmagnetic ceramic.

Each of the magnetic cores 2, 20, 21 and 22 has a head 31 which is tapered to a width approximately equal to the width of tracks. A nonmagnetic spacer15 of $SiO_2$ or the like is sandwiched between the heads of each pair of magnetic cores 2, 20 (21, 22) joined together to form a gap G1 (G2).

A magnetic shield member 12 is interposed between the opposed pairs of heads 31, i.e., between the gaps G1 and G2 to prevent cross talk. The shield member 12 can be formed by fixing electrically conductive plates, for example, of Cu or Ag to each surface of a magnetic sheet of Parmalloy.

With reference to FIGS. 1 and 2, each of the lower magnetic cores 20 and 22 includes at its rear portion a rectangular stud portion 3 having the same thickness as the head 31 and made integral with the head 31 by a stepped portion 30 of reduced thickness. The height of projection of the stud portion 3 beyond the stepped portion 30 is about 50–100 μm or higher than this. On the other hand, the upper magnetic cores 2 and 21 shown are each in the form of a flat plate of uniform thickness and have the same contour as the lower magnetic cores 20 and 22, respectively.

A coil 4 is provided around the stud portion 3 of each of the magnetic cores 20 and 22. Each end of the coil wire is connected to a coil terminal 40 provided at the rear end of the base plate 10.

The shield member 12 has a height to extend from one base plate 1 to the other base plate 10 and a length to extend between the heads 31 of the cores 20, 22 and further extend rearward beyond the stepped portions 30 thereof.

Figure 23:
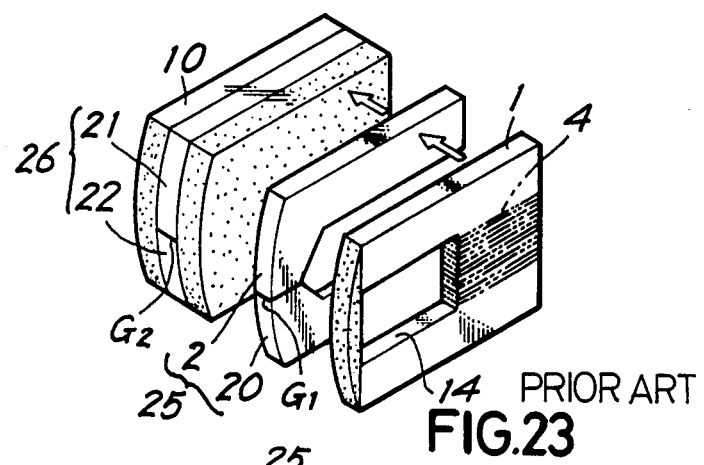
FIG. 23 is an exploded perspective view showing a conventional magnetic head.
Figure 24:
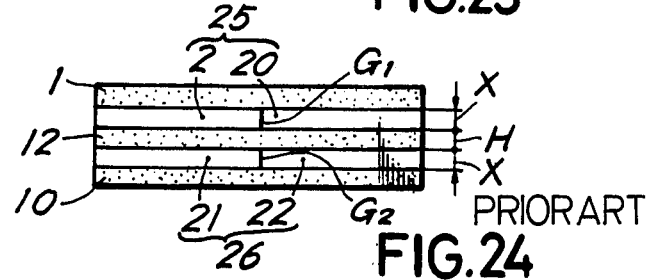
FIG. 24 is a plan view showing the conventional magnetic head.

In construction, the magnetic head described differs from the conventional magnetic head as follows. With the conventional magnetic head shown in FIG. 23, the magnetic cores 2 and 20, as well as 21 and 22, are fixedly joined together end-to-end, with their inner or outer surfaces arranged in a plane perpendicular to a plane containing the gaps G1 and G2, whereas with the magnetic head of FIG. 1, the magnetic cores 2 and 20, as well as 21 and 22, are joined together as superposed on each other at a plane containing the gaps G1 and G2. This structure characterizes the magnetic head of the present invention and also distinctly characterizes the production process of the invention as will be described below to result in various advantages.

The magnetic head is produced by the process to be described below with reference to FIGS. 3 (a) to (f).

Figure 3:
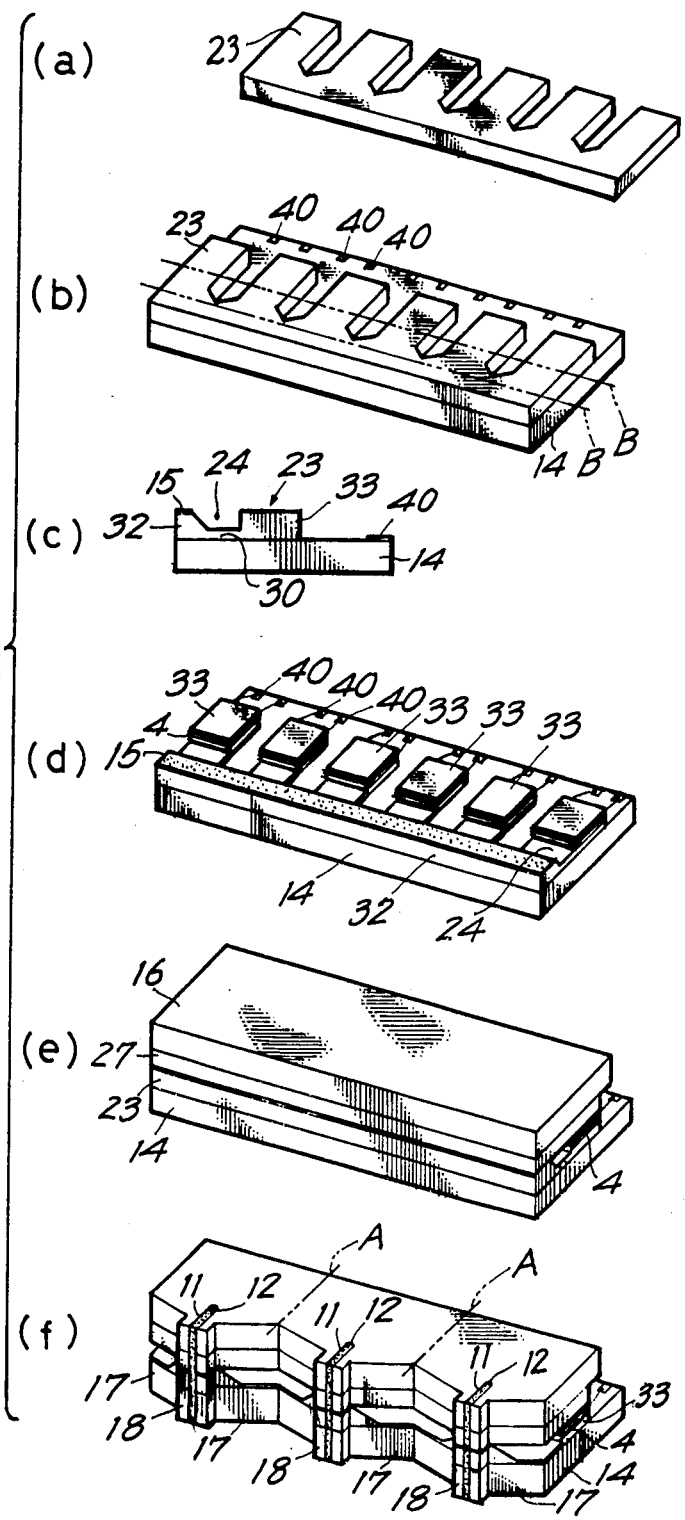
FIGS. 3 (a) to (f) are perspective views showing a process for producing a magnetic head of FIG. 1.

A highly magnetically permeable material such as sendust or the like is machined to prepare a comb-like magnetic plate 23 as shown in FIG. 3 (a). The plate 23 has a highly planar surface.

As seen in FIG. 3 (b), the magnetic plate 23 is joined to a nonmagnetic plate 14 which is already provided with a plurality of terminals 40 at its rear portion. The magnetic plate 23 can be joined to the nonmagnetic plate 14 by frit or an organic resin adhesive of the epoxy or polyamide type.

The magnetic plate 23 shown in FIG. 3 (b) is cut along the phantom lines B, B to remove the portion between the lines on the plate 14, and a widthwise groove 24 is formed in the plate 23 to obtain a single elongated ridge 32 and a plurality of projections 33 made integral with the ridge by a thin stepped portion 30 as shown in FIG. 3 (c) and (d). A spacer 15 of $SiO_2$ is formed on the surface of the ridge 32 to a thickness of 0.2 to 0.3 μm by vacuum evaporation.

A coil 4 is provided around each projection 33, and each end of the coil wire is connected to the terminal 40 (see FIG. 3 (d)).

Next, as seen in FIG. 3 (e), a magnetic plate 27 having approximately the same shape as the magnetic plate 23 of FIG. 3 (a) and secured to a nonmagnetic plate 16 is prepared as a block, which is placed over the block of FIG. 3 (d) and bonded thereto with frit or organic resin adhesive to obtain an assembly as illustrated.

Recesses 17 are then formed in the front side of the assembly at twice the pitch of the projections 33 as shown in FIG. 3 (f), whereby protrusions 18 are formed between the recesses 17. The protrusion 18 is aligned with the center line between the pair of adjacent projections 33 and 33 as seen in FIG. 2.

A cutout 11 extending toward the rear side of the assembly beyond the groove 24 is formed in each protrusion 17, and a shield member 12 is fitted into the cutout 11. The cutouts 11 may be formed before forming the recesses 18. The cutouts 11 are 40 μm in width and about 400 μm in depth. Consequently, the magnetic plate 23 can be divided into a plurality of magnetic pieces each having two projections 33 (see FIG. 2). The shield member 12 may be prepared in the form of a plate conforming to the shape of the cutout 11 and inserted into the cutout. Alternatively, the shield member may be formed by admixing a power of Al, Ag or the like with a resin, injecting the mixture into the cutout 11 and solidifying the mixture.

The assembly is cut along the lines A in FIG. 3 (f), whereby a plurality of magnetic heads shown in FIG. 1 are completed at the same time. The nonmagnetic plates 14, 16 serve as the base plates 1, 10, and the magnetic plates 23, 27 provide the magnetic cores 2, 20, 21 and 23. The ridge 32 and the projections 33 of the magnetic plate 23 respectively provide the heads 31 and stud portions 3 of the magnetic cores 20, 22.

Finally, each magnetic head is finished by polishing, and the surface of the head to be in sliding contact with the record medium is finished to a predetermined outwardly curved surface.

When the coil on the head chip of the magnetic head is energized, the magnetic cores 2, 20 or 21, 22 form a closed magnetic circuit including the stud portion 3, bringing the gap G1 or G2 into operation.

With the production process described above, the nonmagnetic spacer 15 providing the gaps G1 and G2 is formed on the single magnetic plate 23 shown in FIGS. 3 (a) to (d), and the assembly is cut into magnetic heads in the step shown in FIG. 3 (f), with the spacer portions of each pair of head chips 25, 26 remaining in fixed position relative to each other. As a result, the two gaps G1 and G2 can be positioned accurately on a plane, whereby the positioning error involved in the conventional assembling procedure is avoidable.

Further because the production of the magnetic head requires no step of adjusting the position of the gaps G1 and G2, the process is simple and achieves remarkably improved productivity.

When each of the magnetic cores 2, 20, 21 and 22 is formed with a thickness of at least 50 μm, the amount of head depth can be set to an optimum value. This gives a prolonged life to the magnetic head.

FIGS. 4 to 12 show other embodiments wherein the coil 4 formed around the projection 33 in the step shown in FIG. 3 (d) is replaced by a sheet-like coil 4 which is formed by spiralling a conductor within the plane of a flexible base film and fixing the winding to the film.

Figure 4:
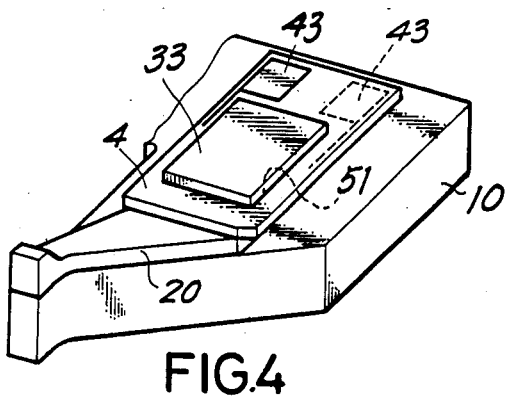
FIG. 4 is a fragmentary perspective view showing a magnetic head comprising a sheet-like coil.

FIG. 4 shows the sheet-like coil 4 as fitted around the projection 33. The coil 4 has a thickness smaller than the height (e.g. 200 μm) of the projection 33, is formed with a centeral hole 51 for the projection to fit in and is integrally provided with terminals 43, 43.

Figure 5:
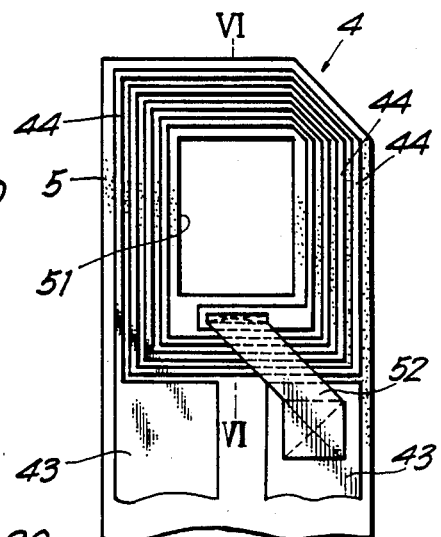
FIG. 5 is an enlarged plan view showing the sheet-like coil.

With reference to FIGS. 5 and 6, the sheet-like coil 4 comprises a flexible base sheet 5 made of an insulating material and having a thickness of about 30 μm, a conductor 44 up to 10 μm in thickness and spiralled around the hole 51 on the base film 5, and an insulation film 50 about 10 μm in thickness and covering the conductor 44. The inner end of the condcutor 44 is electrically connected to one terminal 43 by a connector 52, while the other end thereof is electrically connected to the other terminal 43. Polyester, polyamide or the like is usable for forming the base film 5. The conductor 44 is formed as a strip from Cu or Ag by patterning. The coil is up to 10 μm in the width of the conductor 44 and in the conductor-to-conductor spacing. The number of turns of the coil, which is optional, is for example four in the case of the illustrated embodiment. The sheet coil 4 can be produced at a low cost in quantities. Since the sheet-like coil 4 has an overall thickness of up to 70 μm which is sufficiently smaller than the height (for example, 100 μm) of the projection 33, the magnetic plates 23 and 27 can be joined together by the step of FIG. 3 (e) without any trouble.

When the sheet-like coil 4 is elongated rearward to cause the terminals 43, 43 to project out beyond the base plate 10, the coil terminals 40 shown in FIG. 2 can be dispensed with.

FIGS. 7 to 12 show embodiments wherein conductors 44 are provided in two layers.

With reference to FIGS. 7 and 8, symmetric coils provide a pair of coil half segments 45 and 46, which are joined together as superposed on each other as seen in FIG. 9. The inner ends of conductors 44 are exposed on the upper or lower surfaces of the coil half segments 45, 46 to form connecting portions 47, 48, which are electrically connected together, with the segments joined together as seen in FIG. 9. Thus, the two coil half segments 45, 46 form a sheet-like coil 4.

FIG. 10 shows another sheet-like coil 4 which is obtained by preparing two coil half segments 45 shown in FIG. 7, inverting one of the segments 45 and superposing the segment on the other segment 45.

FIGS. 11 and 12 show another sheet-like coil 4 which comprises a conductor 44 provided on each surface of a single base film 5 and covered with an insulation film 50. The two conductors 44 are connected together at a connection 49.

In the case of sheet-like coils 4 described above, the coil is mountable on the magnetic core 20 or 22 merely by fitting the coil to the stud portion 3 placing the coil in a space between studs without the necessity of winding a conductor around the stud portion 3. This achieves remarkably improved productivity. Further because the conductor 44 is fully protected by the base film 5 and the insulation film 50, the conductor is free of an insulation breakdown and therefore of short-circuiting during manufacture.

The sheet-like coil 4 is not limited to the single-or two-layer structure described but can be of a multilayer structure comprising three or more layers, whereby the coil can be given an increased number of turns.

FIG. 13 shows a magnetic head wherein the pair of gaps G1 and G2 are magnetically insulated from each other more effectively.

In the case of the magnetic head shown in FIGS. 1 to 3 wherein the cutout 11 is formed by machining, the width of the cutout 11 needs to be set to about 40 μm in view of the standard for the pitch of tracks. In this case, the limit to the depth of the cutout 11 is 400 μm. Accordingly, magnetic insulation at rear portion of the magnetic head including coils becomes insufficient, which renders cross talk between channels at rear portion of the magnetic head.

To preclude the above objection, a shield plate 6 opposed to the shield member 12 is inserted between the base plates 1, 10 to separate the space between the two stud portions 3, 3.

Figure 14:
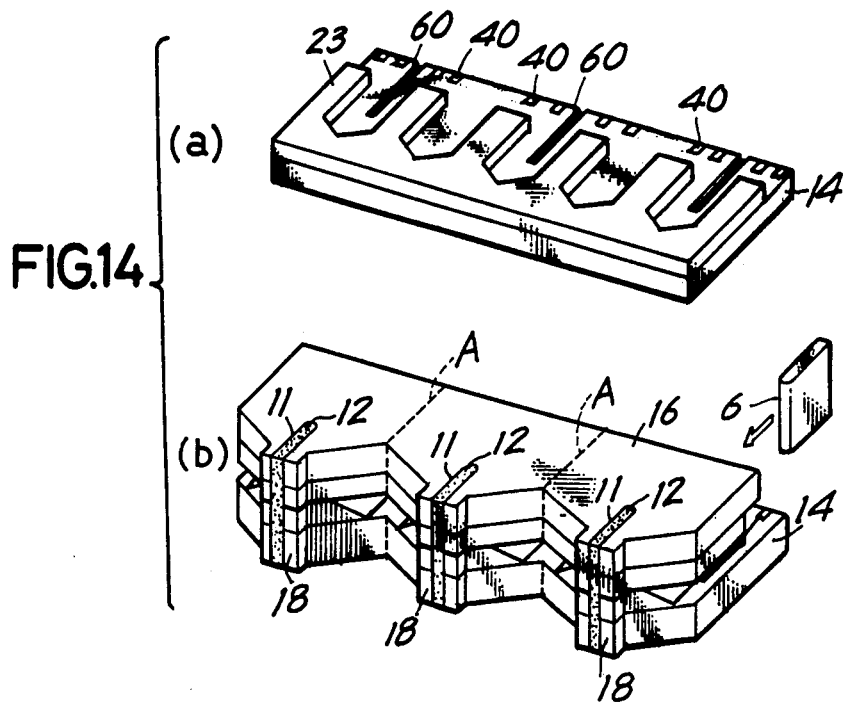
FIGS. 14 (a) and (b) are perspective views showing a process for producing the magnetic head of FIG. 13.

The process for producing this magnetic head includes the steps shown in FIGS. 14 (a) and (b) and corresponding to those of FIGS. 3 (b) and (f). With reference to FIG. 14 (a), the nonmagnetic plate 14 shown in FIG. 3 (b) is formed in its upper surface with grooves 60 extending from its rear end toward the magnetic plate 23 so as to oppose to the shield members 12. The nonmagnetic plate 16 shown in FIG. 3 (e) is also formed in its inner surface with grooves (not shown) opposed to the grooves 60. After the assembly shown in FIG. 14 (b) has been obtained, shield plates 6 separately prepared are inserted into the assembly along the grooves 60 and secured to the nonmagnetic plates, 14, 16. The assembly is thereafter cut along the broken lines A shown, whereby magnetic heads like the one shown in FIG. 13 are completed.

Instead of inserting the rear shield plate 6, a resin containing Ag or the like can be provided in the grooves and in the vicinity thereof as in the case of the front shield member 12 to achieve the same effect as the shield plate 6.

With the magnetic head described above, the pair of head chips 25, 26 are magnetically shielded fully by the shield member 12 and the shield plate 6 over the area of from the heads 31 to the stud portions 3, so that cross talk can be prevented more sufficiently.

Figure 16:
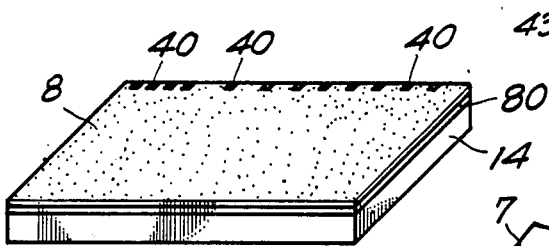
FIGS. 16 and 17 are perspective views showing a process for producing the magnetic head of FIG. 15.
Figure 15:
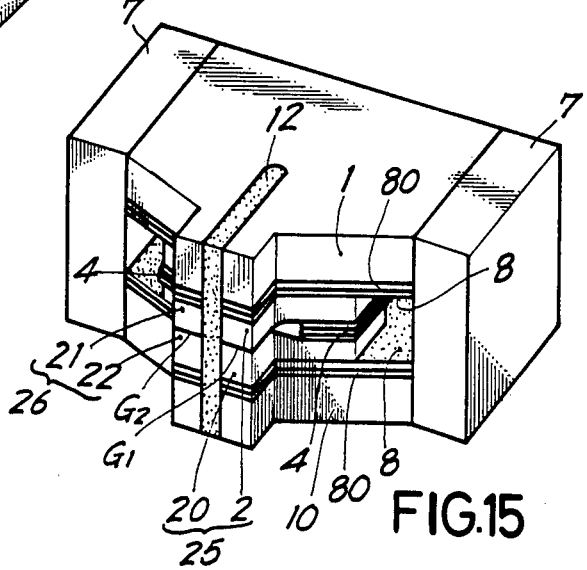
FIG. 15 is a perspective view showing a magnetic head including base plates of magnetic metal material and opposite side magnetic blocks.
Figure 17:
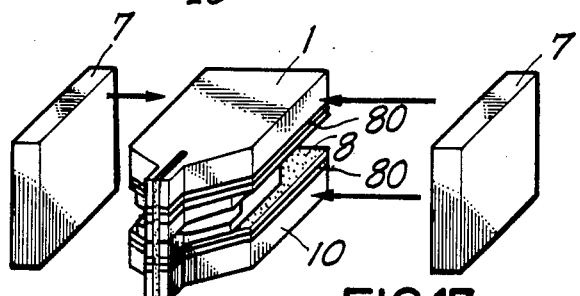

FIGS. 15 to 17 show another magnetic head wherein two base plates 1 and 10 are made of a magnetic metal material, such as sendust, having approximately the same mechanical properties as the magnetic cores. The opposite head chips 25, 26 are magnetically shielded from each other with improved effectiveness, and the magnetic head is improved in mechanical strength and reliability.

With reference to FIG. 15, each of the base plates 1 and 10 of sendust has an electromagnetic shield layer 80 in the form of Ag film ($1.6 \times 10^{-8}$ ohm-cm in specific resistivity) and formed over the inner surface thereof, and an insulation layer 8 in the form of an $SiO_2$ film (at least $10^{15}$ ohm-cm in specific resistivity) is formed over the layer 80. Magnetic cores 2, 21 (20, 22) are fixedly provided on the upper surface of the insulation layer 8. In place of Ag, Cu ($1.7 \times 10^{-8}$ ohm-cm in specific resistivity) is usable for the shield layer 80. In either case, a highly electrically conductive material is useful.

A magnetic block 7, made of a material having high magnetic permeability, such as sendust or Parmalloy, is fixed to each side of the base plates 1, 10 united.

Because the base plates and the magnetic cores are both made of metal, the magnetic plates 14 and 23 for forming them can be bonded not only by frit or organic resin adhesive but also by silver or like soldering or brazing metal.

In the case of a magnetic head in which the base plates 1, 10 are made of nonmagnetic material and which has no magnetic blocks 7, a leakage flux 49, although slight, is produced between the opposed pairs of magnetic cores 2, 21 and 20, 22 on both sides of the shield member 12 as seen in FIG. 19, with the likelihood that cross talk will occur between the two head chips 25, 26. With the magnetic head shown in FIG. 15 and having the base plates 1, 10 of metal magnetic material and the magnetic blocks 7, 7, the magnetic flux 9 produced by each pair of cores 2, 20 (21, 22) forms a magnetic circuit as shown in FIG. 18 through the base plates 1, 10 and the block 7 which are lower in magnetic resistance, thus forming a closed loop within the head chip 25 (26) and therefore causing no cross talk despite the leakage flux. The base plates 1, 10 also shield off the noise from outside.

In the case where the base plates 1, 10 are made of a nonmagnetic nonmetal material, such as ceramic or the like, the difference in workability between the material of the base plates 1, 10 and that of the magnetic cores 2, 20, 21, 22 makes it difficult to work the assembly of such plates and cores by a grindstone or abrasive device. Furthermore, there is a difference in coefficient of expansion between the material of the base plates 1, 10 and the material of the cores 2, 20, 21, 22. (For example, sendust material is $15-20 \times 10^{-6}/°$ C., whereas ceramic materials are $8-13 \times 10^{-6}/°$ C. in coefficient of expansion.) However, when the magnetic plate 23 is to be bonded to the nonmagnetic plate 14 with frit in the step of FIG. 3 (b), the two plates need to be heated. The difference between the two plates 23 and 14 in thermal coefficient is then likely to deform the assembly of the plates or to separate one plate from the other.

In contrast, in the machining step of FIG. 3 (f) to be performed for the magnetic head of FIG. 15, the assembly can be easily worked, for example, by a thin abrasive blade of boronnitride (BN) type, because the magnetic plates 14, 16 and the magnetic plates 23, 27 are both metal. Moreover, since there is little or no difference between the magnetic plate 14 and the magnetic plate 23 in coefficient of thermal expansion, no deformation or separation occurs during production unlike the above-stated case. Further because the plates to be bonded together can be heated to a higher temperature, a glass material, silver brazing material or like bonding agent of higher bond strength is usable. This gives higher reliability to the production process.

FIG. 20 shows another magnetic head wherein the base plates 1 and 10 are made of a nonmagnetic metal material to magnetically shield the two head chips 25 and 26 more effectively and give improved mechanical strength and reliability to the head.

Among the pair of base plates 1, 10 made of nonmagnetic metal material, the base plate 10 is formed with an insulation layer 81 over the rear half of its inner surface where coil terminals 40 are to be fixedly provided. Examples of useful nonmagnetic metal materials for the base plates 1, 10 are those having a magnetically shielding effect and a hardness approximate to that of sendust (Vickers hardness Hv=400 to 500), such as titanium-copper alloy which is $11-25 \times 10^{-8}$ ohm-cm in specific resistivity, 270 to 450 in hardness Hv and $18.6 \times 10^{-6}/°$ C. in coefficient of thermal expansion, and beryllium-copper alloy which is $6.8-8.6 \times 10^{-8}$ ohm-cm in specific resistivity, 300 to 450 in hardness Hv and $17.2 \times 10^{-5}/°$ C. in coefficient of thermal expansion, and sintered metal materials which are approximate to sendust in workability, such as highly electrically conductive ASTM (77 to 80 wt. % Cu and 1 to 2 wt. % Pb).

Figure 21:
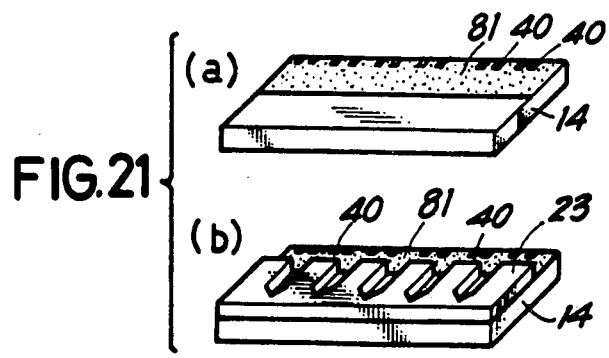
FIGS. 21 (a) and (b) are perspective views showing a process for producing the magnetic head of FIG. 20.

The process for producing the magnetic head includes the steps shown in FIG. 21 (a) and (b) and corresponding to the step of FIG. 3 (b). First as seen in FIG. 21 (a), an insulating layer 81 of $SiO_2$ or the like is formed, for example, by vacuum evaporation on the surface of a nonmagnetic plate 14 of nonmagnetic metal at least at the rear portion thereof where coil terminals 40 are to be provided. The coil terminals are then mounted on the rear end of the nonmagnetic plate 14.

Next as seen in FIG. 21 (b), a magnetic plate 23 is bonded to the nonmagnetic plate 14. The same steps as those shown in FIGS. 3 (c) to (f) thereafter follow, whereby magnetic heads, like the one shown in FIG. 20, are completed.

Figure 22:
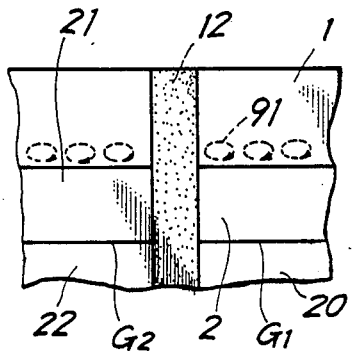
FIG. 22 is a plan view showing the magnetic field of the magnetic head of FIG. 20.

With a magnetic head wherein the base plates 1 and 10 are made of nonmetallic material, a slight magnetic flux 90 occurs as shown in FIG. 19 to result in cross talk, whereas in the case of the above magnetic head wherein the base plates 1 and 10 are made of nonmagnetic metal, the leakage flux produced by the magnetic cores 2, 20, 21 and 22 is shielded off by being confined within the base plates in the form of eddy current as seen in FIG. 22, whereby cross talk is mitigated.

The base plates 1 and 10 of the magnetic head shown in FIG. 20 are made of metal material as is the case with the magnetic head of FIG. 15, so that the magnetic plate 23 or the nonmagnetic plate 14 will not deform or separate during the production process, and the parts are easy to machine. Thus, the magnetic head has the same advantages as the head of FIG. 15.

The structure of the magnetic head of the present invention is not limited to the foregoing embodiments but can of course be modified variously within the scope defined in the appended claims.

What is claimed is:

1. A magnetic head, comprising:

a pair of head chips disposed adjacent one another, each head chip including,
  (a) a pair of plate-like magnetic cores joined together, and
  (b) a gap provided at the junction of said magnetic cores such that said gap from each pair of magnetic cores lie in a common plane with the other gap, said common plane being generally perpendicular to the direction of travel of an associated recording medium,
wherein said magnetic cores of each pair are superposed on one another, each in a plane generally parallel to said common plane;
wherein each magnetic core includes,
  (a) a head with a small width substantially equal to the width of recording tracks on the recording medium
  (b) an end portion having a larger width than said head and located opposite said head, and
  (c) a stud portion disposed on at least one of said pair of magnetic cores at the increased witdth portion thereof and projecting toward the other core,
wherein the end portion, of at least one of said magnetic cores of each pair of cores, is offset with respect to said head, and said stud portion is disposed on the magnetic core having said offset end portion;
a shield portion generally perpendicular to said common plane and being interposed between said head chips for separating said head chips from one another;
a coil wound around said stud portion of each headchip; and
a pair of base plates, each base plate being disposed on one side of said pair of head chips, said base plates being generally parallel to said common plane and having a small width head portion substantially equal to the width of each head of said magnetic cores.

2. A magnetic head as defined in claim 1 wherein the coil is shaped in the form of a sheet and comprises a base film of insulating material, a strip-like conductor spiralled on the base film and an insulation film covering the conductor, the coil being formed at its center with a hole for the stud portion of the magnetic core to fit in.

3. A magnetic head as defined in claim 2 wherein the coil has a multilayer structure comprising a plurality of superposed sheet-like coil pieces, each of the coil pieces comprising a base film of insulating material, a strip-like conductor spiralled on the base film and an insulation film covering the conductor, the conductors of the coil pieces being electrically connected together end-to-end.

4. A magnetic head as defined in claim 1 wherein the shield portion is formed by forming a cutout in the front side of the assembly of the head chips and base plate between the heads of the pairs of magnetic cores and placing a shield member into the cutout.

5. A magnetic head as defined in claim 4 wherein the shield portion further comprises a shield plate provided at a rear portion of the assembly between the pairs of magnetic cores for separating the space between the two stud portions.

6. A magnetic head as defined in claim 1 wherein the base plate is made of a magnetic metal material, and an electrically insulating layer is formed on the base plate over the surface thereof joined to the magnetic core.

7. A magnetic head as defined in claim 1 wherein the base plate is made of a magnetic metal material, and an electromagnetic shield layer on the base plate and an electrically insulating layer on the electromagnetic shield layer are formed over the surface of the base plate joined to the magnetic core.

8. A magnetic head as defined in claim 1 wherein the base plate is made of a non-magnetic metal material, and an electrically insulating layer is formed on the base plate at least over a rear portion thereof.

9. A magnetic head as defined in claim 6 wherein the base plates and the assembly of head chips are fixedly provided with magnetic blocks opposed to each other with respect to the direction of arrangement of the gaps, and a magnetic circuit through the head chip, the magnetic block and the base plates is formed for each head chip.

* * * * *